US009369783B2

(12) United States Patent
Neilson et al.

(10) Patent No.: US 9,369,783 B2
(45) Date of Patent: Jun. 14, 2016

(54) WAVELENGTH-SELECTIVE CROSS-CONNECT DEVICE HAVING ASTIGMATIC OPTICS

(71) Applicants: David T. Neilson, Old Bridge, NJ (US); Roland Ryf, Aberdeen, NJ (US); Nicolas K. Fontaine, Keyport, NJ (US)

(72) Inventors: David T. Neilson, Old Bridge, NJ (US); Roland Ryf, Aberdeen, NJ (US); Nicolas K. Fontaine, Keyport, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 340 days.

(21) Appl. No.: 13/851,371

(22) Filed: Mar. 27, 2013

(65) Prior Publication Data
US 2014/0294346 A1 Oct. 2, 2014

(51) Int. Cl.
*G02B 6/35* (2006.01)
*H04Q 11/00* (2006.01)

(52) U.S. Cl.
CPC ............ *H04Q 11/0005* (2013.01); *G02B 6/356* (2013.01); *H04Q 2011/0016* (2013.01); *H04Q 2011/0022* (2013.01); *H04Q 2011/0026* (2013.01)

(58) Field of Classification Search
None
See application file for complete search history.

(56) References Cited

U.S. PATENT DOCUMENTS

| 6,636,654 | B2 | 10/2003 | McGuire, Jr. |
| 6,707,959 | B2 | 3/2004 | Ducellier et al. |
| 6,711,316 | B2 | 3/2004 | Ducellier |
| 6,751,415 | B1 | 6/2004 | Fabiny |
| 6,760,501 | B2 * | 7/2004 | Iyer et al. ............. G02B 6/2931 385/16 |
| 6,819,823 | B2 | 11/2004 | Solgaard et al. |
| 6,836,381 | B2 | 12/2004 | Giles et al. |
| 6,876,475 | B1 | 4/2005 | Trisnadi et al. |
| 6,947,628 | B1 | 9/2005 | Peng et al. |
| 6,996,343 | B2 | 2/2006 | Neilson |
| 7,106,966 | B1 | 9/2006 | Lalonde et al. |

(Continued)

FOREIGN PATENT DOCUMENTS

| CN | 1397812 A | 2/2003 |
| JP | 2006178454 A | 7/2006 |

(Continued)

OTHER PUBLICATIONS

U.S. Appl. No. 13/399,270, filed Mar. 27, 2013.

(Continued)

*Primary Examiner* — Mike Stahl
(74) *Attorney, Agent, or Firm* — Mendelsohn Dunleavy, P.C.; Yuri Gruzdkov

(57) ABSTRACT

A wavelength-selective cross-connect (WSXC) device configured to route any set of carrier wavelengths from a corresponding input port to any selected output port. The WSXC device comprises a diffraction grating and a beam-steering device optically coupled to one another and to the input/output ports using astigmatic optics. The astigmatic optics includes one or more cylindrical lenses configured to image one beam-steering surface onto another beam-steering surface to enable a continuous spectral response. The astigmatic optics may further include (i) a cylindrical Fourier lens that enables the WSXC device to convert a change in the angular beam steering performed by the beam-steering device into a corresponding image-spot displacement at the output ports and/or (ii) one or more cylindrical lenses configured to image the active surface of the beam-steering device onto the diffraction grating. Various unfolded configurations of the various embodiments of the WSXC device are also disclosed.

18 Claims, 9 Drawing Sheets

(56) References Cited

U.S. PATENT DOCUMENTS

| | | | |
|---|---|---|---|
| 7,203,400 B2 | 4/2007 | Neilson | |
| 7,254,292 B2 | 8/2007 | Tian et al. | |
| 7,283,709 B2 | 10/2007 | Doerr et al. | |
| 7,336,867 B2 | 2/2008 | Wu et al. | |
| 7,397,980 B2* | 7/2008 | Frisken | G02B 6/2713 385/15 |
| 7,558,447 B2 | 7/2009 | Suh et al. | |
| 7,689,073 B2 | 3/2010 | Kozhevnikov et al. | |
| 7,702,194 B2* | 4/2010 | Presley et al. | 385/18 |
| 8,611,742 B2* | 12/2013 | Yang et al. | 398/48 |
| 2002/0030814 A1 | 3/2002 | Mikes et al. | |
| 2002/0076146 A1* | 6/2002 | Iyer et al. | 385/24 |
| 2002/0131687 A1 | 9/2002 | Wilde | |
| 2003/0021522 A1* | 1/2003 | Ducellier | 385/17 |
| 2003/0053749 A1* | 3/2003 | Weverka et al. | 385/24 |
| 2004/0076368 A1* | 4/2004 | Takushima et al. | 385/18 |
| 2004/0184153 A1 | 9/2004 | Neilson | |
| 2004/0207893 A1 | 10/2004 | Miller et al. | |
| 2005/0002600 A1 | 1/2005 | Ducellier et al. | |
| 2005/0018259 A1 | 1/2005 | Holmes | |
| 2005/0105909 A1 | 5/2005 | Stone | |
| 2005/0213877 A1 | 9/2005 | Wu et al. | |
| 2006/0067611 A1* | 3/2006 | Frisken et al. | 385/16 |
| 2006/0222290 A1 | 10/2006 | Yamashita et al. | |
| 2006/0228070 A1* | 10/2006 | Davis et al. | 385/16 |
| 2008/0031627 A1 | 2/2008 | Smith et al. | |
| 2008/0218872 A1* | 9/2008 | Yuan et al. | 359/663 |
| 2008/0316585 A1 | 12/2008 | Cohen et al. | |
| 2009/0028502 A1 | 1/2009 | Presley et al. | |
| 2009/0220233 A1* | 9/2009 | Presley et al. | 398/79 |
| 2010/0172646 A1 | 7/2010 | Colbourne | |
| 2011/0280573 A1 | 11/2011 | Collings et al. | |
| 2012/0057869 A1* | 3/2012 | Colbourne | 398/49 |
| 2012/0093458 A1* | 4/2012 | Matsuura et al. | 385/16 |
| 2013/0038917 A1* | 2/2013 | Watanabe et al. | 359/225.1 |
| 2013/0155501 A1* | 6/2013 | Matsumoto | 359/434 |
| 2013/0194537 A1* | 8/2013 | Mao et al. | G02F 1/133528 349/196 |
| 2013/0272650 A1* | 10/2013 | Ishikawa et al. | 385/17 |
| 2014/0205291 A1 | 7/2014 | Suzuki et al. | |
| 2015/0208143 A1* | 7/2015 | Frisken | G02B 6/3512 398/48 |

FOREIGN PATENT DOCUMENTS

| | | |
|---|---|---|
| JP | 2007519010 A | 7/2007 |
| JP | 2009545771 A | 12/2009 |
| JP | WO2013038713 A1 | 3/2015 |
| KR | 20090048618 A | 5/2009 |

OTHER PUBLICATIONS

"Ophthalmic Optics Files: 4. Ophthalmic Lenses the Different Types", http://www.essiloracademy.eu/EN/press/Pages/ooof.aspx: Published in the 1980's [retrieved on Mar. 27, 2013]. Retrieved from the Internet: <URL: http://www.essiloracademy.eu/SiteCollectionDocuments/WEBSHOP/Cahiers%20d%27Optique%20Oculaire/collectoren/OOF_4_Astigmatic_lenses.pdf> (25 pages).

Zong, Lei, et al., "Study on Wavelength Cross-Connect Realized with Wavelength Selective Switches," Optical Fiber Communication Conference and Exposition and The National Fiber Optic Engineers Conference, Optical Society of America, 2006, paper NThC3, pp. 1-7.

Cavendish, D., et al., "Next Generation Multi-Service Optical Networks," in Network Architectures, Management, and Applications III, Proc. of SPIE, vol. 6022, 2005, pp. 1-10.

"A Performance Comparison of WSS Switch Engine Technologies", www.jdsu.com, 2012 [retrieved on Jan. 13, 2012]. Retrieved from the Internet: <URL: www.jdsu.com/ProductLiterature/wsscomp_wp_cms_ae.pdf> pp. 1-24.

International Search Report and Written Opinion; Mailed May 2, 2013 for corresponding PCT Application No. PCT/US2013/025824.

Sorimoto, K. et al, "Polarization Insensitive Wavelength Selective Switch Using LCOSs and Monolithically Integrated Multi-Layered AWG".

Tsai, J. C. et al., 1/spl times/N<2> Wavelength-Selective Switches With Tilted 2D Collimator Arrays for Inter-Channel-Response Suppression, Lasers and Electro-Optics, 2004. (CLEO). Conference on San Francisco, CA, USA May 20-21, 2004, Piscataway, NJ, USA, IEEE, May 16, 2004.

\* cited by examiner

100

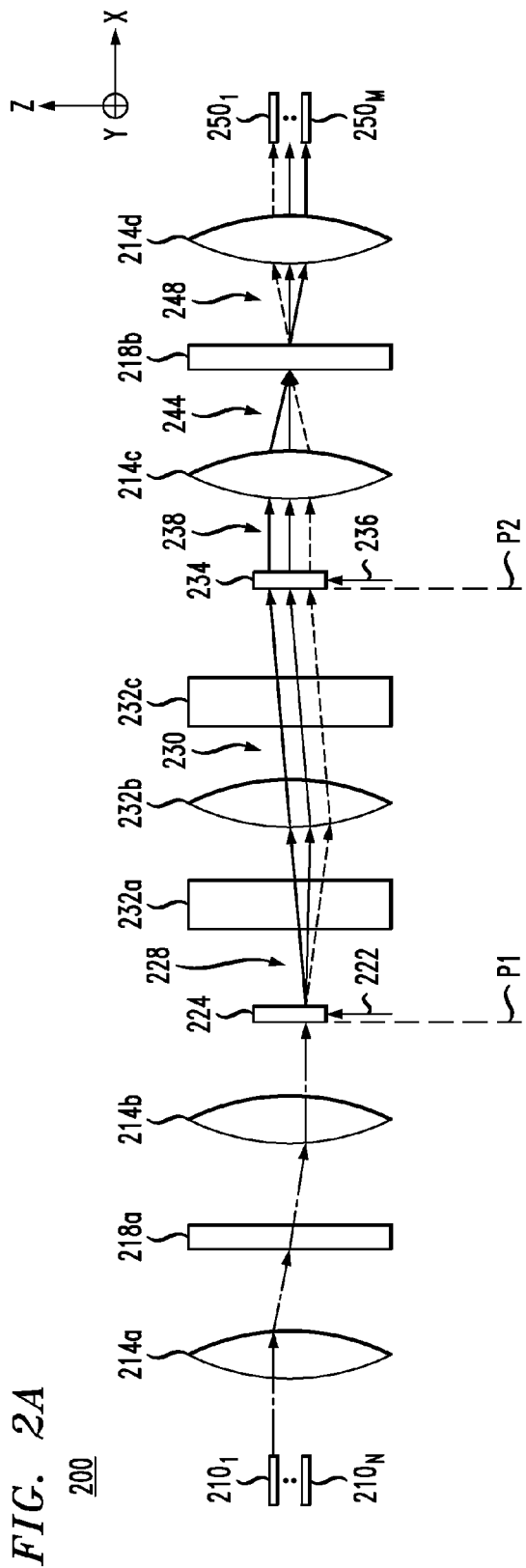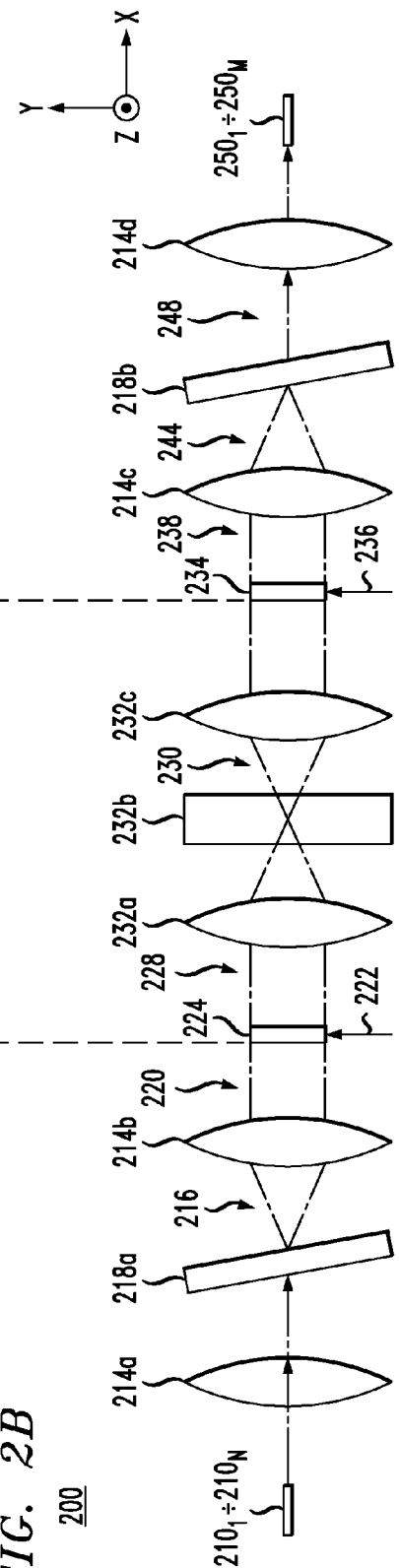

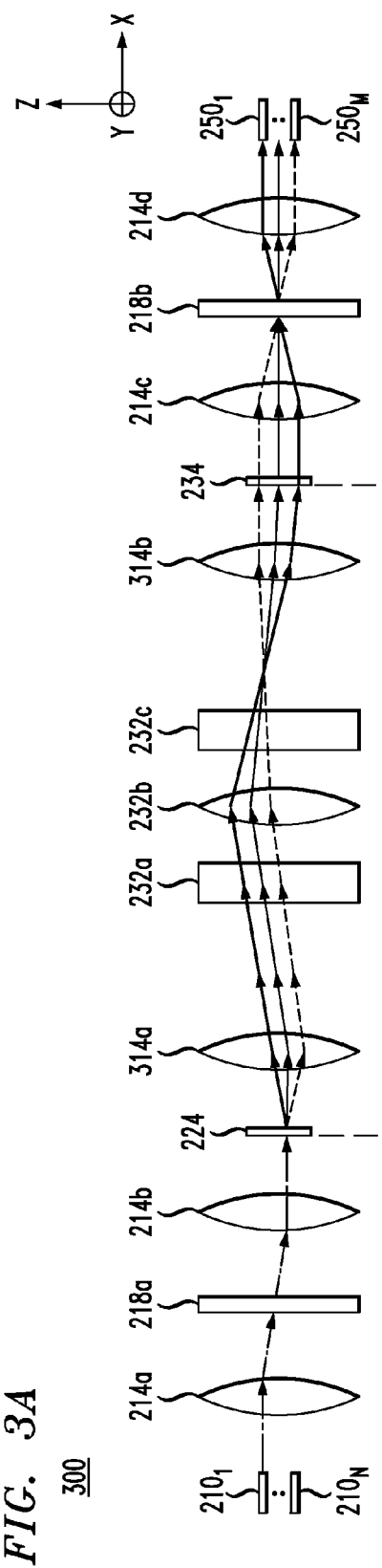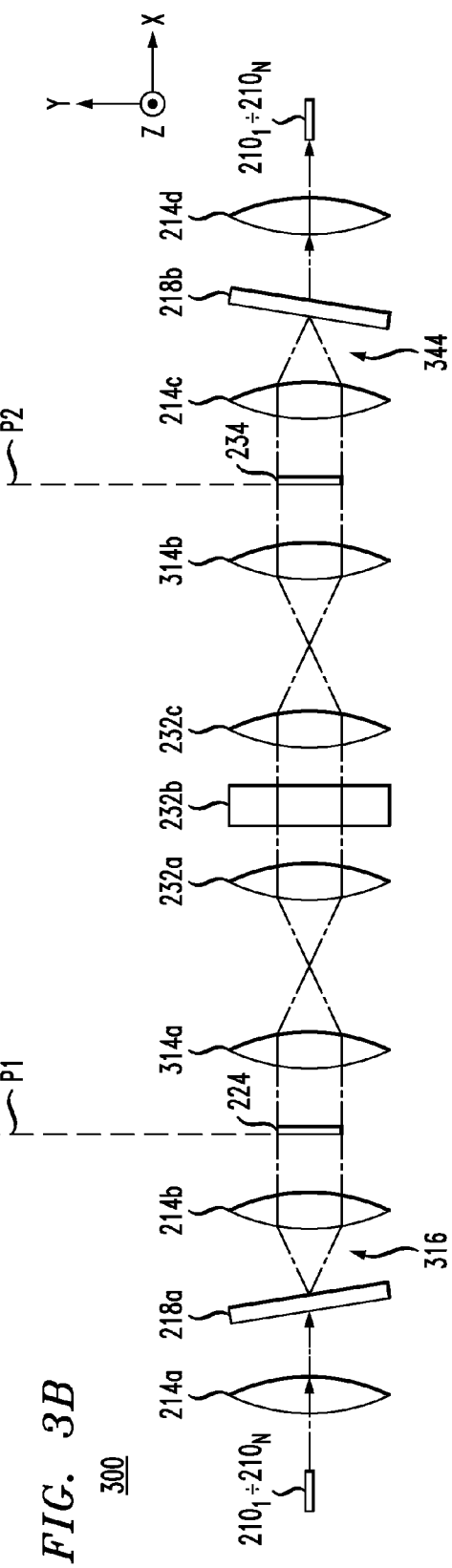

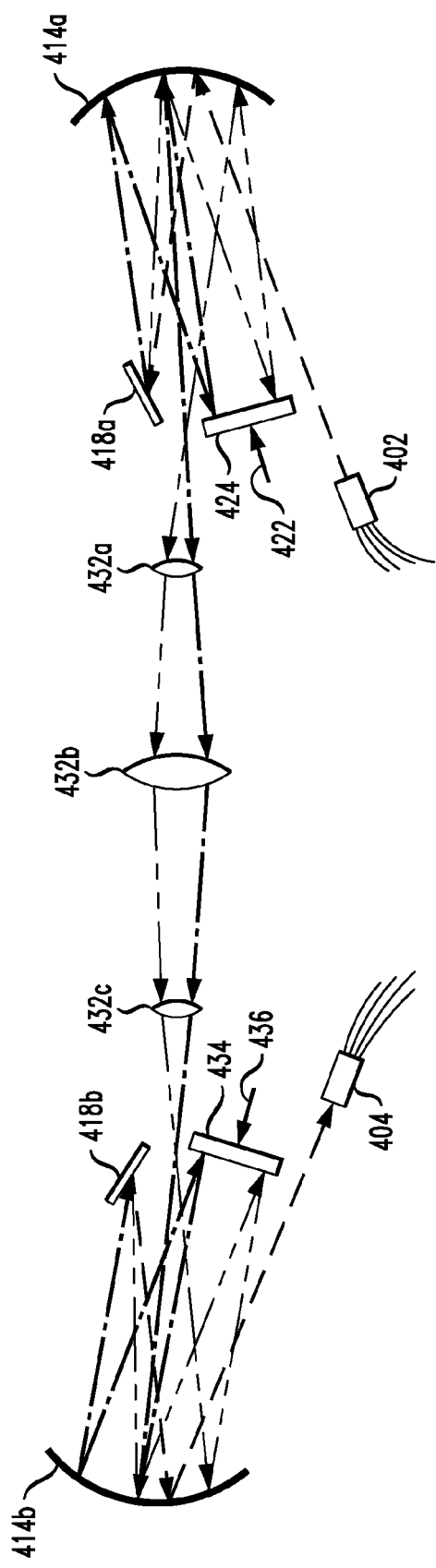

500

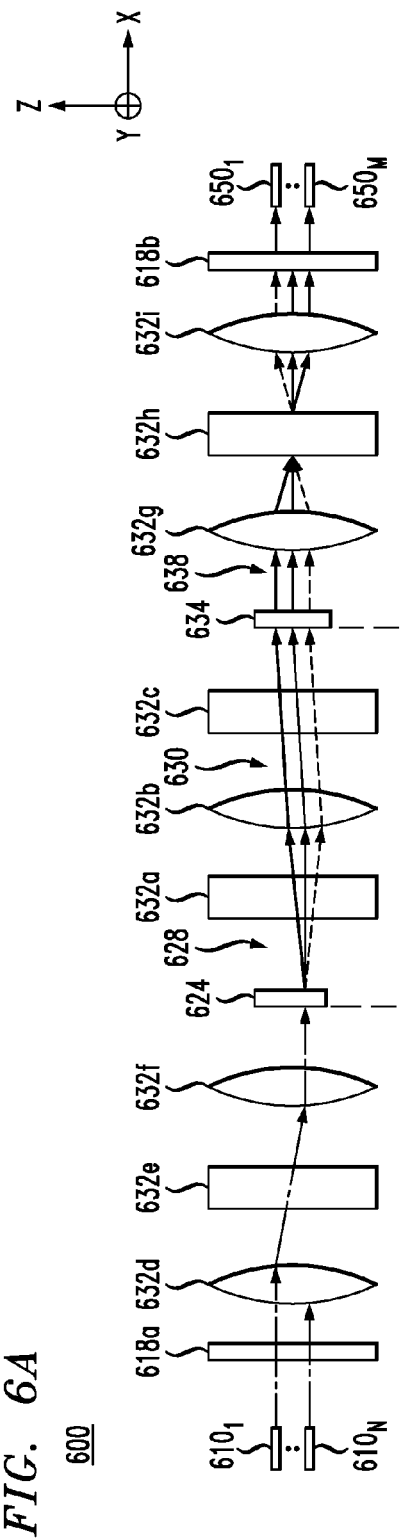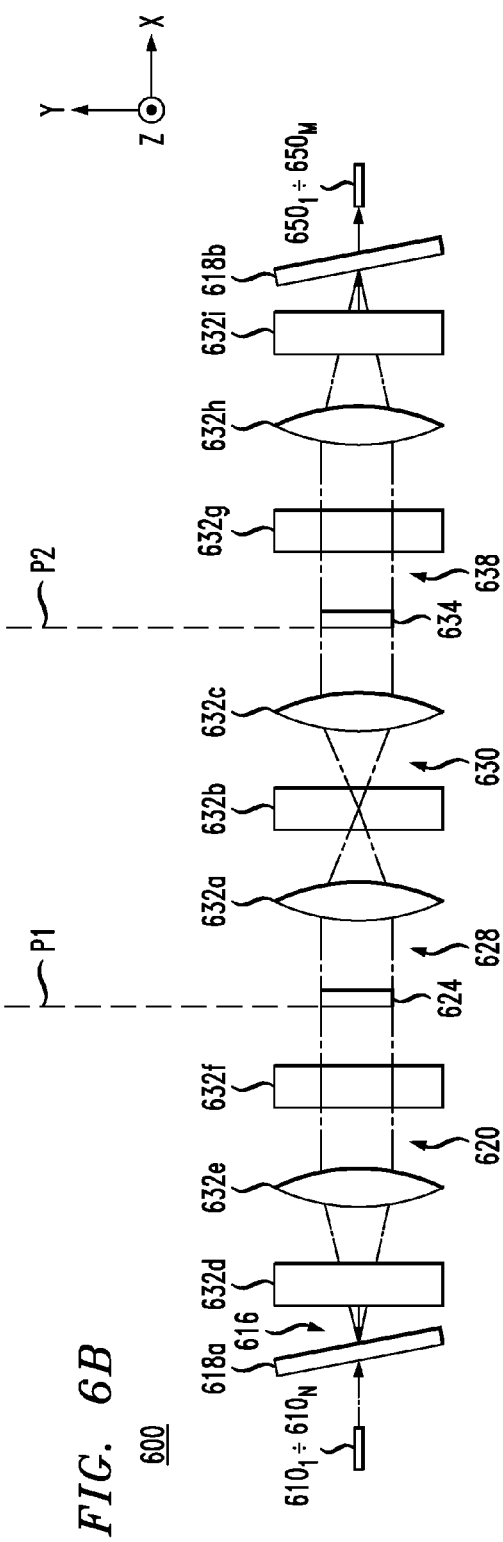
FIG. 6A
FIG. 6B

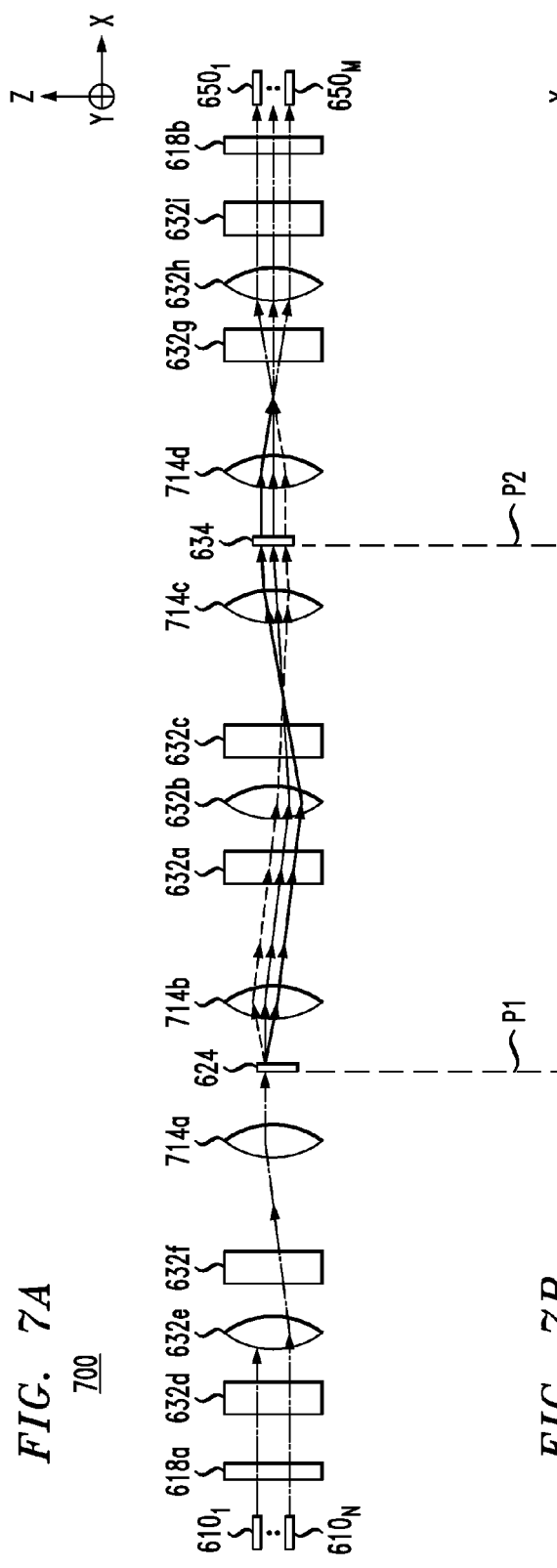
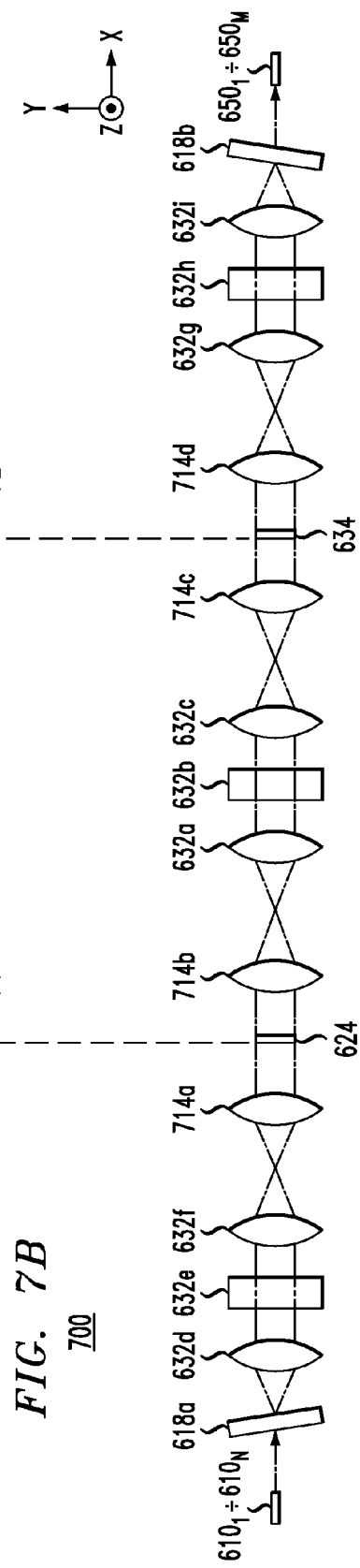
FIG. 7A
700
FIG. 7B
700

800

900

WAVELENGTH-SELECTIVE CROSS-CONNECT DEVICE HAVING ASTIGMATIC OPTICS

CROSS-REFERENCE TO RELATED APPLICATIONS

This application is related to U.S. patent application Ser. No. 13/399,270, filed on Feb. 17, 2012, and entitled "COMPACT WAVELENGTH-SELECTIVE CROSS-CONNECT DEVICE HAVING MULTIPLE INPUT PORTS AND MULTIPLE OUTPUT PORTS," which is incorporated herein by reference in its entirety.

BACKGROUND

1. Field

The present disclosure relates to optical communication equipment and, more specifically but not exclusively, to wavelength-selective cross-connect switches and reconfigurable optical add/drop multiplexers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Wavelength-selective cross-connect (WSXC) switches and reconfigurable optical add/drop multiplexers (ROADMs) are important network elements in optical wavelength-division-multiplexing (WDM) networks because they can support dynamic provisioning and automated restoration in the network and can be implemented to be transparent to the signal bit rate, modulation format, and transmission protocol. Substantially the same physical-device architecture can be used to implement a WSXC switch and a ROADM, with the classification of the resulting physical device as the former or the latter depending mostly on the degree of switching enabled by the device. An optical-WDM network architecture employing WSXC devices has many attractive features that help to accelerate service deployment, accelerate rerouting around points of failure in the network, reduce capital and operating expenses for the service provider, and provide a network topology that is amenable to future network upgrades.

A conventional WSXC device typically comprises a plurality of individual constituent optical devices, such as demultiplexers, smaller switches, and multiplexers, and numerous fiber connections between them. With the rapid growth of optical transport capacities, the number of constituent optical devices that are required to implement an adequate conventional WSXC device may be on the order of one hundred or even more. As a result, conventional WSXC devices are disadvantageously facing many challenges, such as increased footprint, relatively high maintenance complexity and cost, and reduced reliability.

SUMMARY OF SOME SPECIFIC EMBODIMENTS

Disclosed herein are various embodiments of a WSXC device having N input ports and M output ports and configured to route any set of one or more carrier wavelengths from a corresponding input port to any selected output port. The WSXC device comprises a diffraction grating and a beam-steering device optically coupled to one another and to the input/output ports using astigmatic optics.

In one embodiment, the WSXC device is configured such that each of the carrier wavelengths impinges on the diffraction grating and the beam-steering device two times en route from the respective input port to the designated output port. The astigmatic optics includes one or more cylindrical lenses configured to image a first portion of the active surface of the beam-steering device onto a different second portion of that active surface.

In some embodiments, the astigmatic optics may further include (i) a cylindrical Fourier lens that enables the WSXC device to convert a change in the angular beam steering performed by the beam-steering device into a corresponding image-spot displacement at the output ports and/or (ii) one or more cylindrical lenses configured to image the active surface of the beam-steering device onto the diffraction grating. Various unfolded configurations of the various embodiments of the WSXC device are also disclosed.

The disclosed embodiments have certain advantages over conventional WSXC devices, e.g., because they can be implemented using a relatively small number of constituent device components, have a relatively small footprint, have good scalability characteristics, and allow for flexible wavelength channel-center and width assignment.

According to one embodiment, provided is an apparatus comprising: a first plurality of ports; a second plurality of ports; a first diffraction grating interposed between the first plurality of ports and the second plurality of ports; a first beam-steering device interposed between the first plurality of ports and the second plurality of ports and having a first beam-steering surface; and a first astigmatic optical element interposed between the first plurality of ports and the second plurality of ports. Each port of the first plurality is configured to receive a respective input WDM signal having two or more respective WDM components. The apparatus is configured to variously route the WDM components from the first plurality of ports to the second plurality of ports such that each of the WDM components impinges on the first diffraction grating, the first beam-steering surface, and the first astigmatic optical element. The first diffraction grating is configured to spectrally disperse light received from the first plurality of ports and direct spectrally dispersed light to the first beam-steering surface. The first beam-steering surface is configurable to individually steer beams corresponding to different wavelength bands of the spectrally dispersed light received from the first diffraction grating to enable the apparatus to route any of the WDM components from the respective port of the first plurality to any port of the second plurality.

According to another embodiment, provided is an apparatus comprising: first optical means configured to spectrally disperse each of a plurality of incoming optical beams to generate a plurality of spectrally dispersed optical beams, wherein the apparatus is configured to receive each of the plurality of the incoming optical beams through a terminus of a respective optical fiber or waveguide; second optical means configured to steer the plurality of spectrally dispersed optical beams to generate a plurality of steered optical beams; third optical means configured to apply a spatial Fourier transform to the plurality of steered optical beams to generate a plurality of transformed optical beams; fourth optical means configured to de-diversify the plurality of transformed optical beams to generate a plurality of de-diversified optical beams; and fifth optical means configured to spectrally recombine the de-diversified optical beams to generate a plurality of outgoing optical beams, wherein the apparatus is configured to apply each of the plurality of the outgoing optical beams to a terminus of a respective optical fiber or waveguide.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 2A-2B illustrate the structure and operation of a WSXC device according to an embodiment of the disclosure;

FIGS. 3A-3B illustrate the structure and operation of a WSXC device according to another embodiment of the disclosure;

FIG. 4 shows a block diagram of a WSXC device according to yet another embodiment of the disclosure;

FIGS. 6A-6B illustrate the structure and operation of a WSXC device according to yet another embodiment of the disclosure;

FIGS. 7A-7B illustrate the structure and operation of a WSXC device according to yet another embodiment of the disclosure;

DETAILED DESCRIPTION

Figure 1:
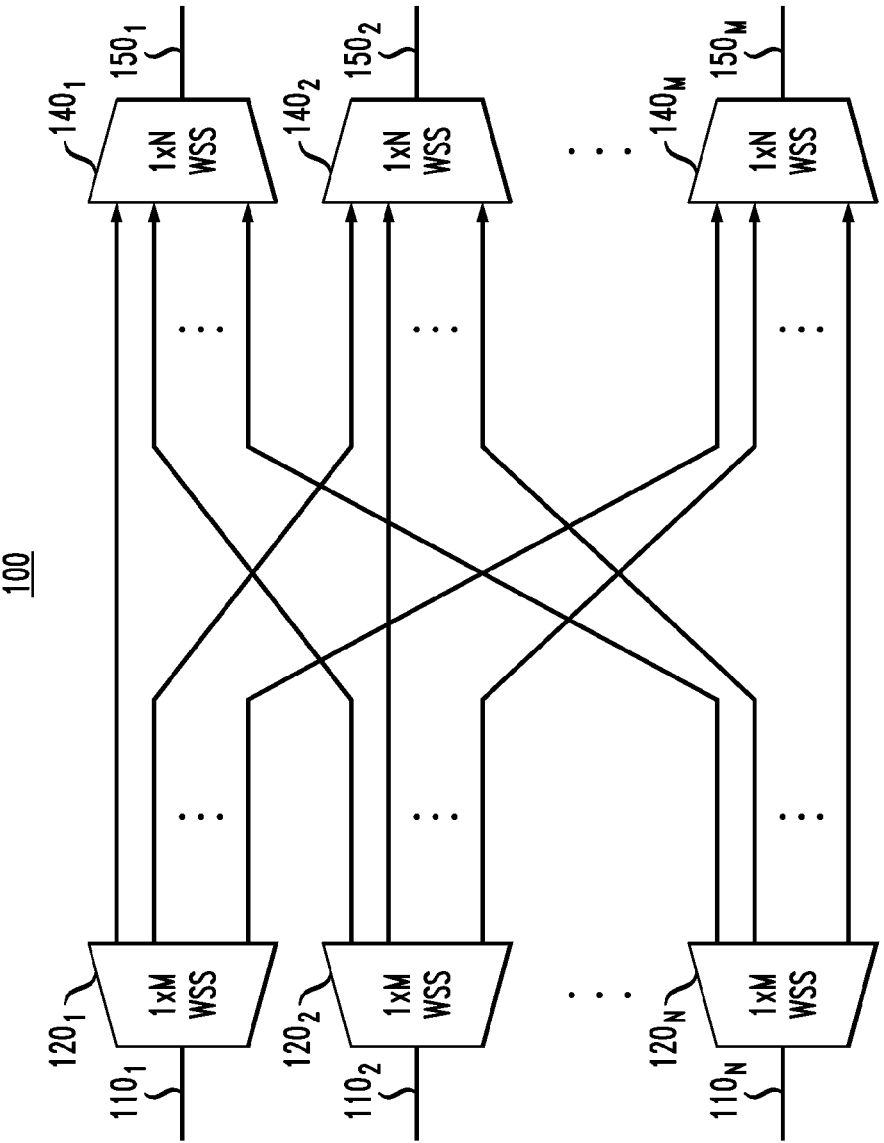
FIG. 1 shows a representative functionality of a wavelength-selective cross-connect (WSXC) device according to an embodiment of the disclosure.

FIG. 1 shows a block diagram of an optical device 100 having a functionality of a wavelength-selective cross-connect (WSXC) device according to an embodiment of the disclosure. Device 100 has N input ports $110_1$-$110_N$ and M output ports $150_1$-$150_M$, where N and M are (either the same or different) integers greater than one. After device 100 is deployed, each of input ports 110 and output ports 150 may have a respective optical fiber (not explicitly shown in FIG. 1) connected to it. In operation, each of these optical fibers is configured to transport a respective WDM signal. In principle, each of the transported WDM signals can have an arbitrary number of WDM components (modulated carrier wavelengths), with the total number K of unique carrier wavelengths that are being handled by device 100 being independent of N and/or M.

Device 100 is shown as having N (1×M) wavelength-selective switches (WSSs) $120_1$-$120_N$ and M (1×N) wavelength-selective switches (WSSs) $140_1$-$140_M$, interconnected as shown in FIG. 1. A wavelength-selective switch is a (re) configurable optical multiplexer/de-multiplexer that can be configured to route the full set or any selected subset of the K carrier wavelengths between its common port and a selected one of its plural ports. As used herein, the term "common port" refers to the port located at the side of the switch having a single port (see FIG. 1). The term "plural port" refers to any of the ports located at the side of the switch having multiple ports (also see FIG. 1). For example, in device 100, each wavelength-selective switch $120_i$ has its common port optically coupled to the corresponding input port $110_i$. Similarly, each wavelength-selective switch $140_i$ has its common port optically coupled to the corresponding output port $150_i$. The plural ports of wavelength-selective switches $120_1$-$120_N$ are optically coupled to the plural ports of wavelength-selective switches $140_1$-$140_M$ as indicated in FIG. 1. The latter connection can be implemented, e.g., through free space with mirrors and lenses or through optical waveguides.

Each wavelength-selective switch 120 is configured to operate as a configurable de-multiplexer that routes optical signals from the common port to the various plural ports. Each wavelength-selective switch 140 is configured to operate as a configurable multiplexer that routes optical signals from the various plural ports to the common port. Using the routing characteristics of wavelength-selective switches 120 and 140, device 100 is capable of directing any carrier wavelength or any set of two or more carrier wavelengths from any input port 110 to any output port 150. In operation, device 100 may employ a switch controller (not explicitly shown in FIG. 1) that is operatively connected to control the routing configurations of wavelength-selective switches $120_1$-$120_N$ and $140_1$-$140_M$. The controller may use appropriate routing algorithms, e.g., to avoid signal collisions at any of output ports $150_1$-$150_M$, with a collision being an event in which two different optical signals having the same carrier wavelength arrive simultaneously at the same output port 150.

Various wavelength-selective switches that can be used to implement wavelength-selective switches $120_1$-$120_N$ and $140_1$-$140_M$ in device 100 are disclosed, e.g., in U.S. Pat. Nos. 7,283,709, 7,689,073, and 7,336,867, the teachings of all of which are incorporated herein by reference in their entirety.

FIGS. 2A-2B illustrate the structure and operation of a WSXC device 200 according to an embodiment of the disclosure. More specifically, FIG. 2A shows a schematic side view of device 200. FIG. 2B shows a corresponding schematic top view of device 200. The orientation of the Cartesian coordinate axes X, Y, and Z for each of the two views is indicated in FIGS. 2A and 2B by a respective vector triple. FIGS. 2A and 2B also show representative ray traces that are referred to in the description below to explain light propagation and processing in device 200.

Various embodiments of device 200 have a general functionality analogous to that of WSXC device 100 (FIG. 1). More specifically, input ports $210_1$-$210_N$ of device 200 are functionally analogous to input ports $110_1$-$110_N$ of device 100. Output ports $250_1$-$250_M$ of device 200 are functionally analogous to output ports $150_1$-$150_M$ of device 100. As will be clear from the description that follows, embodiments of device 200 have certain advantages over conventional WSXC devices, e.g., because device 200 can be implemented using a relatively small number of constituent device components, have a relatively small footprint, and have good scalability characteristics.

In one embodiment, each of input ports $210_1$-$210_N$ comprises a fiber connector for connecting a corresponding optical fiber configured to deliver a respective optical WDM signal to device 200. Input ports $210_1$-$210_N$ are arranged so that the optical fibers connected to the ports all lie in a plane that is parallel to the XZ plane. Similarly, each of output ports $250_1$-$250_M$ comprises a fiber connector for connecting a corresponding optical fiber configured to receive a respective optical WDM signal from device 200, e.g., for further transport to external devices. Output ports $250_1$-$250_M$ are also arranged so that the optical fibers connected to the ports all lie in a plane that is parallel to the XZ plane.

In an alternative embodiment, each of ports 210 and 250 can be an aperture for receiving a corresponding (e.g., multicolored) collimated beam of light.

Device 200 comprises: diffraction gratings 218a and 218b; beam-steering devices 224 and 234; spherical lenses 214a-214d; and cylindrical lenses 232a-232c. Diffraction gratings 218a and 218b have the same nominal light-dispersion characteristics. In some embodiments, at least some of the lenses shown in FIG. 2 may be omitted. In an alternative embodiment, alternative optical elements, such as micro-prism arrays and/or micro-lens arrays configured to redirect the various beams and/or sub-beams in a manner similar to that indicated in FIGS. 2A-2B, may be substituted for some of the aforementioned lenses.

Each of beam-steering devices 224 and 234 can be implemented, e.g., using (i) a two-dimensional pixelated MEMS mirror array or (ii) a liquid crystal on silicon (LCOS) microdisplay. In a MEMS embodiment, the orientation of MEMS mirrors in the array can be controllably changed to steer the corresponding reflected beam(s) of light in the intended direction(s). In an LCOS embodiment, the phase shift imparted onto the corresponding optical beam by the individual pixels of the micro-display can be appropriately controlled to create linear optical phase retardation in the direction of the intended beam deflection. In both cases, different portions of the beam-steering device can be individually configured to steer the different optical beams impinging on the device in different respective directions.

In operation, device 200 is connected to a routing controller (not explicitly shown in FIG. 2) configured to appropriately control the beam steering imparted by beam-steering devices 224 and 234. More specifically, the routing controller controls the configuration of beam-steering device 224 via a control signal 222. The routing controller similarly controls the configuration of beam-steering device 234 via a control signal 236. In general, control signals 222 and 236 cause different pixelated portions of each of beam-steering devices 224 and 234 to adopt different respective beam-steering configurations, e.g., to enable the intended wavelength-selective routing of light from various input ports $210_1$-$210_N$ to various output ports $250_1$-$250_M$.

Device 200 can conceptually be viewed as an improvement of the WSXC device shown in FIG. 2 of the above-referenced U.S. patent application Ser. No. 13/399,270. The latter WSXC device is hereafter referred to as the 9270-device. Although device 200 and the 9270-device are functionally similar, device 200 can be implemented using fewer optical elements than the 9270-device. This (possible) reduction in the number of the constituent optical elements is achieved, at least in part, as further explained below, due to the use in device 200 of astigmatic optics, e.g., represented by cylindrical lenses 232a-232c.

To achieve the WSXC functionality, both device 200 and the 9270-device are configured to perform the following light-processing operations:

(1) One or more diffraction gratings are used to spectrally disperse the received light across the active planes of the beam-steering devices (see, e.g., 218a, 224, and 234 in FIG. 2B), and then spectrally recombine the variously steered beams to generate one or more output WDM signals, which enables wavelength selectivity in the WSXC device;

(2) One or more lenses (see, e.g., 232a-232c and 214c-214d in FIG. 2A) are used to perform a spatial Fourier transform that converts angular beam steering into a corresponding image-spot displacement at the output-port array, which enables the WSXC device to route light from any input port to any output port; and (3) One or more lenses are used to perform imaging from one beam-steering surface to another beam-steering surface (see, e.g., 232a-232c, 224, and 234 in FIGS. 2A-2B), which enables a proper (e.g., continuous) spectral response of the WSXC device.

However, one difference between device 200 and the 9270-device is that device 200 is designed to use astigmatic optics to spatially overlap the second and third light-processing operations. More specifically, cylindrical lens 232b is configured to perform the second (i.e., the spatial Fourier transform) light-processing operation in the plane parallel to the XZ plane (see FIG. 2A), while cylindrical lenses 232a and 232c are configured to perform the third (i.e., the imaging) light-processing operation in the plane parallel to the XY plane (see FIG. 2B), with the spatial overlap between these two light-processing operations occurring because the Fourier-transform lens 232b is located between the imaging lenses 232a and 232c. For comparison, the spherical lenses used in the 9270-device impose a spatial configuration in which the second and third light-processing operations are performed sequentially, in spatially non-overlapping manner. The latter characteristic causes the 9270-device to employ the corresponding additional optical elements.

In operation, diffraction grating 218a spectrally disperses the (multicolored) light that it receives through lens 214a from each of input ports $210_1$-$210_N$. The light is spectrally dispersed in the plane parallel to the XY plane along the Y-coordinate axis, e.g., as indicated by a diverging sector of traces 216 in FIG. 2B. Lens 214b, which is positioned to have diffraction grating 218a in its focal plane, collimates (makes parallel) the diverging light of traces 216 and applies the resulting collimated light beam(s) 220 to beam-steering device 224, e.g., as indicated in FIG. 2B. For example, if input port $210_i$ receives white light, then, at plane P1, which schematically represents the beam-steering surface of beam-steering device 224, diffraction grating 218a generates a corresponding strip of light in which different wavelengths are projected at different locations along the strip in a rainbow-like manner.

Beam-steering device 224 is configured to steer various beams of light by changing their propagation direction in the plane parallel to the XZ plane, e.g., as indicated by a fan of traces/beams 228 in FIG. 2A. To implement wavelength-selective mapping of the array of N input ports $210_1$-$210_N$ onto the array of M output ports $250_1$-$250_M$, each pixelated portion of beam-steering device 224 can be configured, based on control signal 222, to cause a deflection angle selected from a respective set of M different discrete beam deflection angles. A more-detailed explanation of the beam-steering performed by beam-steering device 224, for the specific example of N=6 and M=9, can be found, e.g., in the above-referenced U.S. patent application Ser. No. 13/399,270. Based on that explanation, one of ordinary skill in the art will be able to understand how to configure beam-steering device 224 for any chosen number(s) N and M of input/output ports.

En route from beam-steering device 224 to beam-steering device 234, the light processed by beam-steering device 224 traverses cylindrical lenses 232a-232c. The cylindrical axes of lenses 232a and 232c are parallel to one another and to the Z coordinate axis. The cylindrical axis of lens 232b is parallel to the Y coordinate axis and, as such, is orthogonal to the cylindrical axes of lenses 232a and 232c. In one embodiment, lenses 232a and 232c have the same focal length and are nominally identical to one another.

Cylindrical lens 232a focuses beams 228 in the pane parallel to the XY plane onto the optical plane of cylindrical lens 232b, e.g., as indicated in FIG. 2B. In the plane parallel to the XZ plane, cylindrical lens 232a acts as a plano-parallel plate, e.g., as indicated in FIG. 2A.

Cylindrical lens 232b collimates (makes parallel), in the plane parallel to the XZ plane, the various deflected beams 228 generated by beam-steering device 224 to produce up to M parallel sheets 230 of light for each multicolored strip of light produced by the input ports at plane P1. For illustration purposes, FIG. 2A shows only three such light sheets 230, with the other (possible) light sheets being omitted for clarity of depiction. Note that cylindrical lens 232b serves as a Fourier lens configured to perform a spatial Fourier transform that converts angular steering into spatial separation of the switched beams, which is a part of the second of the above-mentioned three light-processing operations.

Cylindrical lens 232c re-collimates, in the plane parallel to the XY plane, the rays of light in the various sheets 230, e.g., as indicated in FIG. 2B. In the plane parallel to the XZ plane, cylindrical lens 232c acts as a plano-parallel plate, e.g., as indicated in FIG. 2A.

At plane P2, which schematically represents the beam-steering surface of beam-steering device 234, collimated light sheets 230 received from lens 232c produce up to M (multicolored) strips of light, with different wavelengths being received at different locations along the respective strip in a rainbow-like pattern. While light sheets 230 originating from the same input port 210 are parallel to one another, e.g., as indicated in FIG. 2A, light sheets 230 originating from different input ports 210 are not parallel to one another. As a result, each of the M (multicolored) strips of light at plane P2 generally receives light that has angular diversity in the plane parallel to the XZ plane. The routing controller uses control signal 236 to configure beam-steering device 234 to (i) substantially remove this angular diversity from (de-diversify) each of the M (multicolored) strips of light and (ii) optionally make each of the resulting M light sheets 238 parallel to the XY plane.

Spherical lens 214c, diffraction grating 218b, and spherical lens 214d are configured to couple each of M light sheets 238 generated by beam-steering device 234 into a respective one of output ports $250_1$-$250_M$, e.g., as indicated in FIGS. 2A-2B. Spherical lens 214c nominally has the same focal length as cylindrical lens 232c and serves to focus the sheets of light generated by beam-steering device 234 onto diffraction grating 218b, e.g., as indicated by converging beams 244 in FIGS. 2A and 2B. Diffraction grating 218b serves to remove the angular spectral dispersion in the plane parallel to the XY plane, thereby generating M beams 248, e.g., as indicated in FIGS. 2A and 2B. Lens 214d serves to collimate beams 248 in the XZ planes and make the resulting collimated beams substantially parallel to the X-coordinate axis. The latter characteristic enables each of collimated beams to couple, with relatively low loss, into the corresponding one of output ports $250_1$-$250_M$, e.g., as indicated in FIG. 2A.

The focal lengths of lenses 214a-214d and 232a-232c are selected so as to enable device 200 to properly image the apertures of input ports $210_1$-$210_N$ onto the apertures of output ports $250_1$-$250_M$. The relative positions of the various lenses, diffraction gratings, and beam-steering devices in device 200 may be set based on the relevant principles of relay imaging and/or Fourier optics. For example, lenses 214a and 214b may be configured to image the apertures of input ports $210_1$-$210_N$ onto plane P1. Lenses 214c and 214d may be configured to image the apertures of output ports $250_1$-$250_M$ onto plane P2. Lenses 232a and 232c may be configured to image plane P1 onto plane P2. Each of beam-steering devices 224 and 234 may be positioned to be at the Fourier plane of lens 232b. Additional relay optics (not explicitly shown in FIGS. 2A-2B) may be used, e.g., to optically match different sections of device 200 to one another.

FIGS. 3A-3B illustrate the structure and operation of a WSXC device 300 according to another embodiment of the disclosure. More specifically, FIG. 3A shows a schematic side view of device 300. FIG. 3B shows a corresponding schematic top view of device 300. The orientation of the Cartesian coordinate axes X, Y, and Z for each of the two views is indicated in FIGS. 3A and 3B by a respective vector triple. FIGS. 3A and 3B also show representative ray traces that illustrate light propagation and processing in device 300.

Device 300 is generally analogous to device 200 and incorporates many of the same optical elements. The description of the characteristics and functions of these (common) optical elements is already given above in reference to FIGS. 2A-2B and will not be repeated here. Instead, the description of device 300 that follows focuses on the differences between devices 300 and 200.

One difference between devices 300 and 200 is that device 300 incorporates a 4f optical relay comprising lenses 314a and 314b. Lens 314a is inserted between beam-steering device 224 and cylindrical lens 232a. Lens 314b is similarly inserted between beam-steering device 234 and cylindrical lens 232c. In one embodiment, lenses 314a, 314b, 214b, and 214c have the same focal length and are nominally identical to one another.

In a possible alternative embodiment of device 300, cylindrical lens 232b can be replaced by an appropriate spherical lens.

One benefit of having the 4f optical relay (comprising lenses 314a and 314b) in device 300 is that it causes the two halves of device 300 (one to the left of lens 232b and the other to the right of lens 232b) to be mirror images of one another, which enables the structure of device 300 to be amenable to "folding." In contrast, the two corresponding halves of device 200 (one to the left of lens 232b and the other to the right of lens 232b; see FIGS. 2A-2B) are not mirror images of one another, e.g., due to the different respective orientations of diffraction gratings 218a and 218b. More specifically, in device 200, diffraction gratings 218a and 218b are oriented so that, in diverging sector 216 (see FIG. 2B), the wavelength increases in the positive Y direction while, in converging sector 244 (see FIG. 2B), the wavelength increases in the negative Y direction. However, the addition of the 4f optical relay causes the relative orientation of diffraction gratings 218a and 218b to be changed so that, both in diverging sector 316 and converging sector 344 (see FIG. 3B) the wavelength increases in the positive Y direction.

As used herein, the term "folding" refers to a design method that enables a reduction in the number of optical elements in an alternative embodiment of a device by utilizing one or more symmetries inherent to the corresponding "unfolded" device structure, such as the above-explained mirror symmetry of the two halves of device 300. The application of folding results in a "folded configuration," which is an optical layout in which light impinges on some optical elements two or more times along the optical path that the light takes between an input port of the device and an output port of the device. As used herein, the term "impinge on" should be construed to encompass at least two different types of events, one type being an event during which light passes or gets transmitted through an optical component, and another type being an event during which light is reflected or deflected by an optical component. The use of a folded configuration may be advantageous, e.g., because the corresponding physical device can be more compact and/or less expensive than that employing the original unfolded configuration.

FIG. 4 shows a block diagram of a WSXC device 400 according to yet another embodiment of the disclosure. Device 400 is generally analogous to device 300 (FIGS. 3A-3B), with the functionally analogous elements of the two devices being labeled with numerical labels having the same last two digits. However, one difference between devices 300 and 400 is that the latter represents a folded configuration of the former. The various light traces shown in FIG. 4 by dashed lines illustrate representative optical paths that the light takes in device 400 between one of the input ports in an input-port array 402 and the output ports in an output-port array 404. Inspection of these traces reveals that device 400 has a folded configuration, e.g., because each of curved mirrors 414a and 414b is traversed three times.

In operation, an input port of array 402 directs a respective WDM signal to mirror 414a. Mirror 414a redirects the WDM signal to diffraction grating 418a. Diffraction grating 418a spectrally disperses the received WDM signal and directs the dispersed signal back to mirror 414a, which further directs the dispersed signal to a beam-steering device 424. Beam-steering device 424, being controlled by a control signal 422 generated by a routing controller (not explicitly shown in FIG. 4), appropriately deflects the various optical beams having different carrier wavelengths and directs the variously deflected beams back to mirror 414a, which then redirects these beams, via lenses 432a-432c, to mirror 414b. On the first, second, and third passes, mirror 414a performs optical functions that are similar to those performed by lens 214a, lens 214b, and lens 314a, respectively, in device 300 (see FIGS. 3A-3B).

In one embodiment, lenses 432a and 432c are cylindrical lenses. Lens 432b can be either a cylindrical lens or a spherical lens. Lenses 432a, 432b, and 432c perform optical functions that are similar to those performed by lenses 232a, 232b, and 232c, respectively, in device 300 (see FIGS. 3A-3B).

Mirror 414b redirects the signal(s) received from mirror 414a to a beam-steering device 434. Beam-steering device 434, being controlled by a control signal 436 generated by the routing controller, appropriately deflects the various optical beams having different carrier wavelengths and directs the variously deflected beams back to mirror 414b, which then redirects these beams to diffraction grating 418b. Diffraction grating 418b partially collimates the received beams by removing the spectral dispersion and directs the resulting spectrally recombined beams back to mirror 414b, which couples them into the intended output ports of output-port array 404. On the first, second, and third passes, mirror 414b performs optical functions that are similar to those performed by lens 314b, lens 214c, and lens 214d, respectively, in device 300 (see FIGS. 3A-3B).

Figure 5:
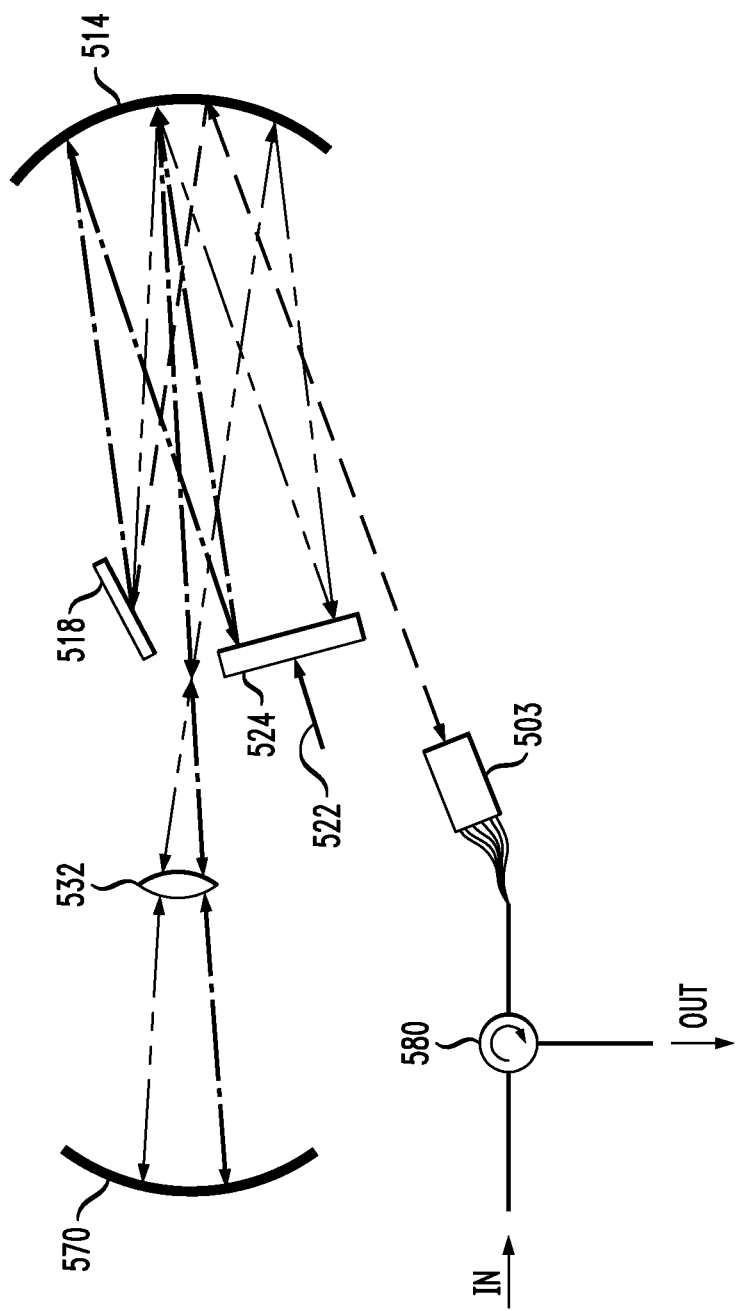
FIG. 5 shows a block diagram of a WSXC device according to yet another embodiment of the disclosure.

FIG. 5 shows a block diagram of a WSXC device 500 according to yet another embodiment of the disclosure. Device 500 represents further folding of device 400 (FIG. 4). More specifically, the folding is accomplished by (i) employing a curved mirror 570 instead of lens 432b, (ii) removing a duplicate section of the device, and (iii) employing a single array 503 of ports as both input ports and output ports, with the separation of the incoming and outgoing optical signals being performed using an optical circulator 580. Having a common port array 503 for both input and output purposes enables flexible rearrangement and reassignment of the various ports to change the effective operative values of M and/or N for device 500.

In operation, a port of array 503 operating as an input port directs a WDM signal to be processed to a curved mirror 514. Mirror 514 redirects the WDM signal to a diffraction grating 518. Diffraction grating 518 spectrally disperses the received WDM signal and directs the dispersed signal back to mirror 514, which further directs the dispersed signal to a first portion of a two-dimensional array of beam-steering elements in a beam-steering device 524. Said first portion of beam-steering device 524, being appropriately controlled by a control signal 522 generated by a routing controller (not explicitly shown in FIG. 5), deflects the various optical beams having different carrier wavelengths and directs the variously deflected beams back to mirror 514, which then redirects these beams, via a cylindrical lens 532, to mirror 570.

Mirror 570 returns the received signal, via cylindrical lens 532, back to mirror 514, which then redirects it to a second portion of the two-dimensional array of beam-steering elements in beam-steering device 524. Said second portion of beam-steering device 524, being also appropriately controlled by control signal 522, appropriately deflects the various optical beams having different carrier wavelengths and directs the variously deflected beams back to mirror 514, which then redirects these beams to diffraction grating 518. Diffraction grating 518 partially collimates the beams by removing the spectral dispersion and directs the resulting partially collimated beams back to mirror 514, which couples them into the intended ports of array 503.

On the first, second, third, fourth, fifth, and sixth passes, mirror 514 performs optical functions that are similar to those performed by lenses 214a, 214b, 314a, 314b, 214c, and 214d, respectively, in device 300 (see FIGS. 3A-3B). On the first and second passes, diffraction grating 518 performs optical functions that are similar to those performed by diffraction gratings 218a and 218b, respectively, in device 300 (see FIGS. 3A-3B). On the first and second passes, beam-steering device 524 performs optical functions that are similar to those performed by beam-steering devices 224 and 234, respectively, in device 300 (see FIGS. 3A-3B). On the first and second passes, lens 532 performs optical functions that are similar to those performed by lenses 232a and 232c, respectively, in device 300 (see FIGS. 3A-3B). Mirror 570 performs an optical function that is similar to that performed by lens 232b in device 300 (see FIGS. 3A-3B).

FIGS. 6A-6B illustrate the structure and operation of a WSXC device 600 according to yet another embodiment of the disclosure. More specifically, FIG. 6A shows a schematic side view of device 600. FIG. 6B shows a corresponding schematic top view of device 600. The orientation of the Cartesian coordinate axes X, Y, and Z for each of the two views is indicated in FIGS. 6A and 6B by a respective vector triple. FIGS. 6A and 6B also show representative ray traces that are referred to in the description below to explain light propagation and processing in device 600.

Various embodiments of device 600 have a general functionality analogous to that of WSXC device 100 (FIG. 1). More specifically, input ports $610_1$-$610_N$ of device 600 are functionally analogous to input ports $110_1$-$110_N$ of device 100. Output ports $650_1$-$650_M$ of device 600 are functionally analogous to output ports $150_1$-$150_M$ of device 100.

Device 600 is also generally analogous to device 200 and comprises similar optical elements. However, one difference between devices 600 and 200 is that, in device 600, diffraction gratings 618a and 618b are directly adjacent to input ports $610_1$-$610_N$ and output ports $650_1$-$650_M$, respectively. This placement of the gratings enables (i) the light from input ports $610_1$-$610_N$ to impinge directly onto diffraction grating 618a, e.g., without traversing any additional optical elements, and (ii) the spectrally recombined light from diffraction grating 618b to impinge directly onto output ports $650_1$-$650_M$, e.g., without traversing any additional optical elements. This placement of gratings 618a-618b further enables the input/output beams in device 600 to be parallel to one another at the respective diffraction grating, which can be beneficial, e.g., because better uniformity of effective spectral-dispersion characteristics can be achieved for different light paths within the device. In contrast, in device 200, a lens (e.g., 214a or 214d in FIG. 2) is located between the input/output ports and the respective diffraction grating, and the optical input/output beams are not parallel to one another at the respective diffraction grating (see, e.g., traces 244 and 248 in FIG. 2A).

In addition to diffraction gratings 618a and 618b, device 600 comprises beam-steering devices 624 and 634 and cylindrical lenses 632a-632i. Lenses 632b, 632d, 632f, 632g, and 632i have their cylindrical axes oriented parallel to the Y coordinate axis. Lenses 632a, 632c, 632e, and 632h have their cylindrical axes oriented parallel to the Z coordinate axis. The various individual lenses 632a-632i are positioned in device 600 so as to accomplish the following:

(1) Image the images of input ports $610_1$-$610_N$ formed at the light-dispersing surface of diffraction grating 618a onto the active beam-steering surface (e.g., plane P1) of beam-steering device 624 in the view corresponding to FIG. 6A;

(2) Cause the images of input ports $610_1$-$610_N$ formed at the light-dispersing surface of diffraction grating 618a to be located in the Fourier plane with respect to plane P1 in the view corresponding to FIG. 6B;

(3) Image plane P1 onto the active beam-steering surface (e.g., plane P2) of beam-steering device 634 in the view corresponding to FIG. 6A;

(4) Cause plane P2 to be located in the Fourier plane with respect to plane P1 in the view corresponding to FIG. 6A;

(5) Image the virtual images of output ports $650_1$-$650_M$ located at the light-dispersing surface of diffraction grating 618b onto plane P2 in the view corresponding to FIG. 6A; and (6) Cause the virtual images of output ports $650_1$-$650_M$ located at the light-dispersing surface of diffraction grating 618b to be located in the Fourier plane with respect to plane P2 in the view corresponding to FIG. 6B.

Similar to device 200, device 600 can be connected to a routing controller (not explicitly shown in FIG. 6) configured to appropriately control the beam steering imparted by beam-steering devices 624 and 634 to enable flexible (e.g., dynamically re-configurable) wavelength-selective routing of light from various input ports $610_1$-$610_N$ to various output ports $650_1$-$650_M$.

In operation, diffraction grating 618a spectrally disperses the (multicolored) light that it receives from each of input ports $610_1$-$610_N$. The light is spectrally dispersed in the plane parallel to the XY plane along the Y-coordinate axis, e.g., as indicated by a diverging sector of traces 616 in FIG. 6B. Cylindrical lens 632e, which is positioned to have diffraction grating 618a in its focal plane, receives the spectrally dispersed light through cylindrical lens 632d, partially collimates the diverging light of traces 616 by making them parallel to one another in the plane parallel to the XY plane, and applies the resulting partially collimated light beam(s) 620, through cylindrical lens 632f, to beam-steering device 624, e.g., as indicated in FIG. 6B. Note that, in the view corresponding to FIG. 6B, cylindrical lenses 632d and 632f act as plano-parallel plates, while cylindrical lenses 632e acts as a Fourier lens. In the view corresponding to FIG. 6A, cylindrical lenses 632d and 632f image the light-dispersing surface of diffraction grating 618a onto the active beam-steering surface (e.g., plane P1) in beam-steering device 624, while cylindrical lenses 632e acts as a plano-parallel plate.

Beam-steering device 624 is configured to steer various beams of light by changing their propagation direction in the plane parallel to the XZ plane, e.g., as indicated by a fan of traces/beams 628 in FIG. 6A. Beams 628 are then directed via cylindrical lenses 632a-632c to beam-steering device 634.

Cylindrical lens 632a focuses beams 628 in the pane parallel to the XY plane onto the optical plane of cylindrical lens 632b, e.g., as indicated in FIG. 6B. Note that, in the view corresponding to FIG. 6A, cylindrical lens 632a acts as a plano-parallel plate.

Cylindrical lens 632b collimates, in the plane parallel to the XZ plane, the various deflected beams 628 generated by beam-steering device 624 to produce up to M parallel sheets 630 of light for each multicolored strip of light produced by the input ports at plane P1. For illustration purposes, FIG. 6A shows only three such light sheets 630, with the other (possible) light sheets being omitted for clarity of depiction. In the view corresponding to FIG. 6A, cylindrical lens 632b serves as a Fourier lens configured to perform a spatial Fourier transform that converts angular steering into spatial separation of the switched beams.

Cylindrical lens 632c re-collimates, in the plane parallel to the XY plane, the rays of light in the various sheets 630, e.g., as indicated in FIG. 6B. Note that, in the view corresponding to FIG. 6A, cylindrical lens 632c acts as a plano-parallel plate.

At plane P2, collimated light sheets 630 received from lens 632c produce up to M (multicolored) strips of light, with different wavelengths being received at different respective locations along the respective strip. While light sheets 630 originating from the same input port 610 are parallel to one another, e.g., as indicated in FIG. 6A, light sheets 630 originating from different input ports 610 are not parallel to one another. As a result, each of the M (multicolored) strips of light at plane P2 generally receives light that has angular diversity in the plane parallel to the XZ plane. The routing controller configures beam-steering device 634 to (i) substantially remove this angular diversity for each of the M (multicolored) strips of light and (ii) make each of the resulting M light sheets 638 parallel to the XY plane.

Cylindrical lenses 632g, 632h, and 632i and diffraction grating 618b are configured to couple each of M light sheets 638 generated by beam-steering device 634 into a respective one of output ports $650_1$-$650_M$, e.g., as indicated in FIGS. 6A-6B, by performing light-processing operations that are substantially inverse of the light-processing operations performed by diffraction grating 618a and cylindrical lenses 632d, 632e, and 632f. More specifically, in the view corresponding to FIG. 6A, cylindrical lenses 632g and 632i image plane P2 of beam-steering device 634 onto the light-dispersing surface of diffraction grating 618b, while cylindrical lens 632h acts as a plano-parallel plate. In the view corresponding to FIG. 6B, cylindrical lenses 632g and 632i act as plano-parallel plates, while cylindrical lenses 632h acts as a Fourier lens. Diffraction grating 618b removes the angular spectral dispersion in the plane parallel to the XY plane to couple the resulting spectrally recombined beams, with relatively low loss, into output ports $650_1$-$650_M$.

FIGS. 7A-7B illustrate the structure and operation of a WSXC device 700 according to yet another embodiment of the disclosure. More specifically, FIG. 7A shows a schematic side view of device 700. FIG. 7B shows a corresponding schematic top view of device 700. The orientation of the Cartesian coordinate axes X, Y, and Z for each of the two views is indicated in FIGS. 7A and 7B by a respective vector triple. FIGS. 7A and 7B also show representative ray traces that illustrate light propagation and processing in device 700.

Device 700 is generally analogous to device 600 and incorporates many of the same optical elements. The description of the characteristics and functions of these (common) optical elements is already given above in reference to FIGS. 6A-6B and will not be repeated here. Instead, the description of device 700 that follows focuses on the differences between devices 700 and 600.

One difference between devices 700 and 600 is that device 700 incorporates two 4f optical relays comprising lenses 714a-714d. Lenses 714a and 714b are inserted to sandwich beam-steering device 624 between them. Lenses 714c and 714d are similarly inserted to sandwich beam-steering device 634 between them. In one embodiment, lenses 714a-714d have the same focal length and are nominally identical to one another.

Another difference between devices 700 and 600 is that, in device 700, the orientation of cylindrical lenses 632a-632i is changed by 90 degrees compared to the orientation of these cylindrical lenses in device 600.

In a possible alternative embodiment of device 700, cylindrical lens 632b can be replaced by an appropriate spherical lens.

One benefit of having the two 4f optical relays in device 700 is that it causes the two halves of device 700 (one to the left of lens 732b and the other to the right of lens 732b) to be mirror images of one another, which enables the structure of device 700 to be amenable to "folding." In contrast, the two corresponding halves of device 600 are not mirror images of one another, e.g., due to the different respective orientations of diffraction gratings 618a and 618b. The orientations of diffraction gratings 618a and 618b in device 600 are not mirror images of one another for the reasons similar to those explained above in reference to the orientation of diffraction gratings 218a and 218b in device 200.

Figure 8:
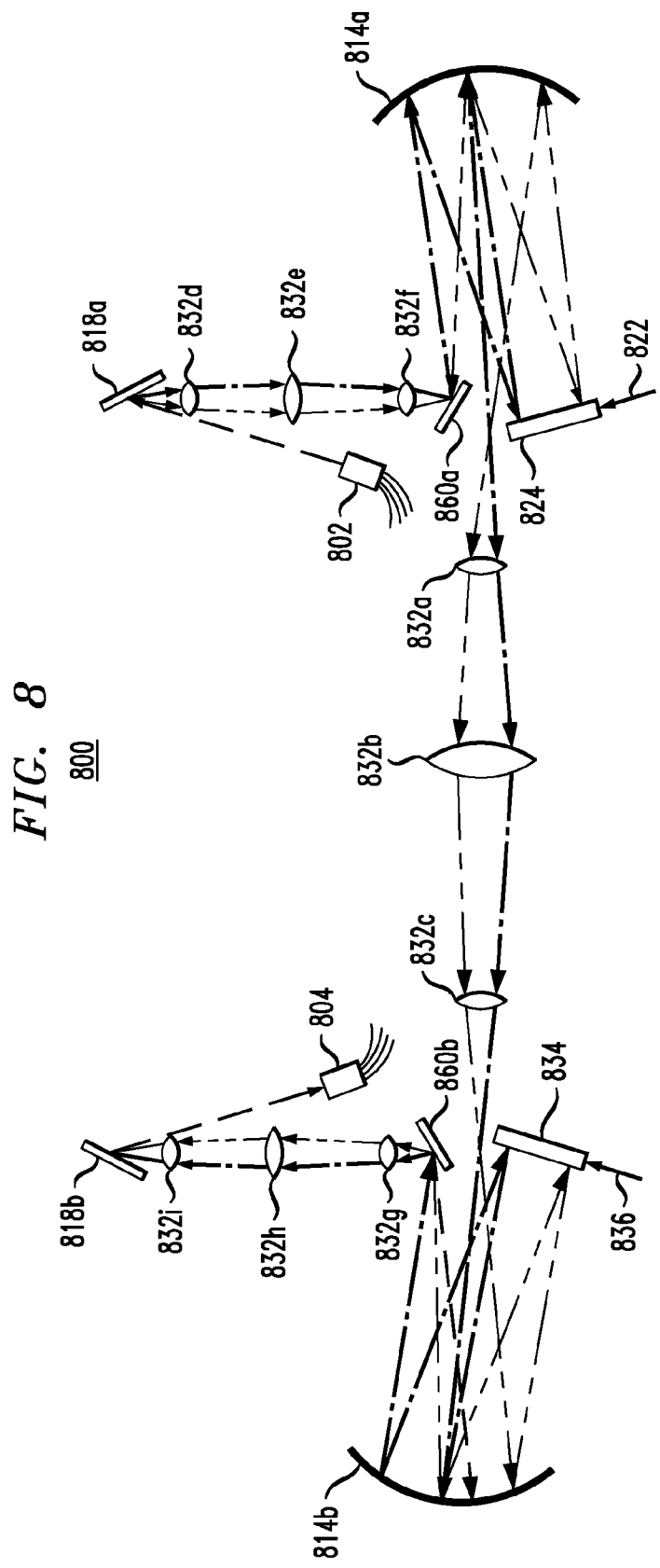
FIG. 8 shows a block diagram of a WSXC device according to yet another embodiment of the disclosure.

FIG. 8 shows a block diagram of a WSXC device 800 according to yet another embodiment of the disclosure. Device 800 is generally analogous to device 700 (FIGS. 7A-7B), with the functionally analogous elements of the two devices being labeled with numerical labels having the same last two digits. However, one difference between devices 700 and 800 is that the latter represents a folded configuration of the former. The various light traces shown in FIG. 8 by dashed lines illustrate representative optical paths that the light takes in device 800 between one of the input ports in an input-port array 802 and the output ports in an output-port array 804. Inspection of these traces reveals that device 800 has a folded configuration, e.g., because each of curved mirrors 814a and 814b is traversed two times.

In operation, an input port of array 802 directs a respective WDM signal to a diffraction grating 818a. Array 802 may incorporate imaging optics (not explicitly shown) to appropriately image each input port onto the surface of diffraction grating 818a. Diffraction grating 818a spectrally disperses the received WDM signal and directs the dispersed signal, via lenses 832d, 832e, and 832f, a flat mirror 860a, and curved mirror 814a, to a beam-steering device 824. Beam-steering device 824, being controlled by a control signal 822 generated by a routing controller (not explicitly shown in FIG. 8), appropriately deflects the various optical beams having different carrier wavelengths and directs the variously deflected beams back to curved mirror 814a, which then redirects these beams, via lenses 832a-832c, to curved mirror 814b. On the first and second passes, mirror 814a performs optical functions that are similar to those performed by lenses 714a and lens 714b, respectively, in device 700 (see FIGS. 7A-7B).

In one embodiment, lenses 832a, 832c, 832d, and 832f are cylindrical lenses. Each of lenses 832b and 832e can be either a cylindrical lens or a spherical lens. Lenses 832a, 832b, 832c, 832d, 832e, and 832f perform optical functions that are similar to those performed by lenses 632a, 632b, 632c, 632d, 632e, and 632f, respectively, in device 700 (see FIGS. 7A-7B).

Curved mirror 814b redirects the signal(s) received from curved mirror 814a to a beam-steering device 834. Beam-steering device 834, being controlled by a control signal 836 generated by the routing controller, appropriately deflects the various optical beams having different carrier wavelengths and directs the variously deflected beams back to mirror 814b, which then redirects these beams, via a flat mirror 860b and lenses 832g-832i, to diffraction grating 818b. Diffraction grating 818b removes the angular spectral dispersion within the received beams and directs the resulting spectrally recombined beams to the intended output ports of output-port array 804. On the first and second passes, mirror 814b performs optical functions that are similar to those performed by lenses 714c and lens 714d, respectively, in device 700 (see FIGS. 7A-7B).

In one embodiment, lenses 832g and 832i are cylindrical lenses. Lens 832h can be either a cylindrical lens or a spherical lens. Lenses 832g, 832h, and 832i perform optical functions that are similar to those performed by lenses 632g, 632h, and 632i, respectively, in device 700 (see FIGS. 7A-7B). Flat mirrors 860a and 860b are optional and are present in the structure of device 800 primarily to alleviate some of the geometric constrains in the device layout.

Figure 9:
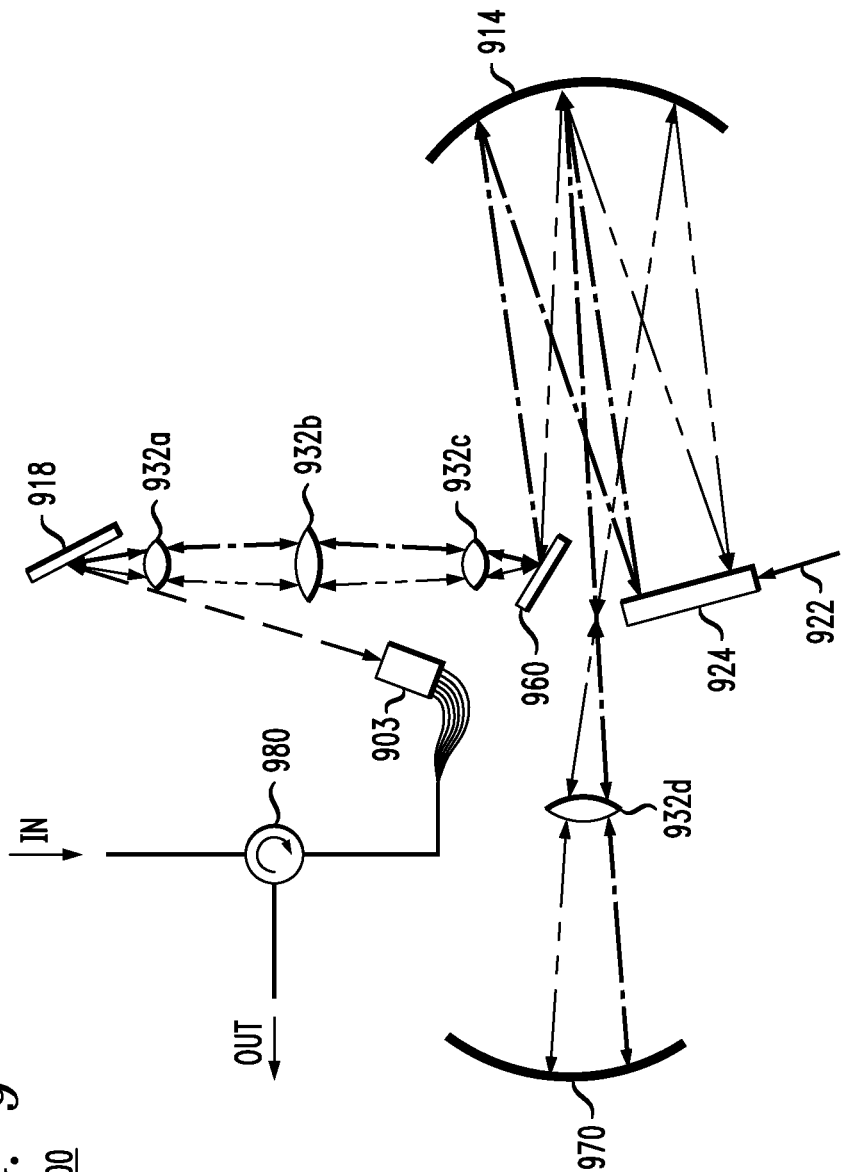
FIG. 9 shows a block diagram of a WSXC device according to yet another embodiment of the disclosure.

FIG. 9 shows a block diagram of a WSXC device 900 according to yet another embodiment of the disclosure. Device 900 represents further folding of device 800 (FIG. 8). More specifically, the folding is accomplished by (i) employing a curved mirror 970 instead of lens 832b, (ii) removing a duplicate section of the device, and (iii) employing a single array 803 of ports as both input ports and output ports, with the separation of the incoming and outgoing optical signals being performed using an optical circulator 980.

In operation, a port of array 903 operating as an input port directs a WDM signal to be processed to a diffraction grating 918. Diffraction grating 918 spectrally disperses the received WDM signal and directs the dispersed signal, via lenses 932a-932c and a flat mirror 960, to a curved mirror 914, which further directs the dispersed signal to a beam-steering device 924. Beam-steering device 924, being controlled by a control signal 922 generated by a routing controller (not explicitly shown in FIG. 9), appropriately deflects the various optical beams having different carrier wavelengths and directs the variously deflected beams back to mirror 914, which then redirects these beams, via a cylindrical lens 932d, to curved mirror 970.

Mirror 970 returns the received signal, via cylindrical lens 932d, back to mirror 914, which then redirects it to beam-steering device 924. Beam-steering device 924 appropriately deflects the various optical beams having different carrier wavelengths and directs the variously deflected beams back to mirror 914, which then redirects these beams, via flat mirror 960 and lenses 932c-932a, to diffraction grating 918. Diffraction grating 918 removes the angular spectral dispersion within the received beams and directs the resulting spectrally recombined beams to the intended ports of array 903.

On the first, second, third, and fourth passes, mirror 914 performs optical functions that are similar to those performed by lenses 714a, 714b, 714c, and 714d, respectively, in device 700 (see FIGS. 7A-7B). On the first and second passes, diffraction grating 918 performs optical functions that are similar to those performed by diffraction gratings 618a and 618b, respectively, in device 700 (see FIGS. 7A-7B). On the first and second passes, beam-steering device 924 performs optical functions that are similar to those performed by beam-steering devices 624 and 634, respectively, in device 700 (see FIGS. 7A-7B). On the first and second passes, lens 932a performs optical functions that are similar to those performed by lenses 632d and 632i, respectively, in device 700 (see FIGS. 7A-7B). On the first and second passes, lens 932b performs optical functions that are similar to those performed by lenses 632e and 632h, respectively, in device 700 (see FIGS. 7A-7B). On the first and second passes, lens 932c performs optical functions that are similar to those performed by lenses 632f and 632g, respectively, in device 700 (see FIGS. 7A-7B). On the first and second passes, lens 932d performs optical functions that are similar to those performed by lenses 632a and 632c, respectively, in device 700 (see FIGS. 7A-7B). Curved mirror 970 performs an optical function that is similar to that performed by lens 632b in device 700 (see FIGS. 7A-7B). On the first and second passes, flat mirror 960 performs optical functions that are similar to those performed by flat mirror 860a and 860b, respectively, in device 800 (see FIG. 8).

In one embodiment, various port arrays can be implemented using a planar waveguide circuit, which enables implementation of additional functionality, such as optical taps for power monitoring.

While this invention has been described with reference to illustrative embodiments, this description is not intended to be construed in a limiting sense.

In various embodiments described in the disclosure, the following relationships between the values of N and M are possible: (i) have M>N; (ii) M<N; and (iii) M=N. These devices may also be configured to implement the effective value of M=1 or N=1.

The use of a pixilated array, such as the liquid crystal on silicon display technology, allows for arbitrary wavelength-channel spacing and arbitrary channel pass-band widths in some embodiments. This feature can be achieved, e.g., by introducing appropriate beam steering. It additionally permits power splitting for broadcast, protection, or monitoring functions. It also enables intra- and inter-channel equalization and dispersion compensation through modification of the pixel patterns.

In some embodiments, polarization-diversity optics can be used to allow for polarization-dependent optical elements in the system.

As used herein, the term "astigmatic optical element" refers to an optical part (such as a lens or a mirror) or a set of optical parts or components that has been deliberately designed, engineered, manufactured, and/or configured to be non-symmetric about a specified optical axis corresponding to the light propagation direction in the optical system. This asymmetry generally causes two sets of parallel light rays, each forming a respective planar light sheet, wherein the two light sheets are orthogonal to one another, to come to different foci after traversing the astigmatic optical element. For example, if an astigmatic optical element is used to form an image of a cross, the vertical and horizontal lines of the cross will be in sharp focus at two different distances from the astigmatic optical element.

In some cases, an optical element may exhibit unintended astigmatism due to a manufacturing error in the surfaces of the constituent parts and/or components or due to misalignment of the same. When appropriately construed, the term "astigmatic optical element" should exclude optical elements that are not intended to be astigmatic by design or configuration and exhibit only an unintended or aberrant form of astigmatism.

Representative examples of astigmatic optical elements include, but are not limited to: a cylindrical mirror, a plano-cylindrical lens, a bicylindrical lens, a sphero-cylindrical lens, a toric lens, and a sphero-toric lens.

In some embodiments, an astigmatic optical element can generally be characterized by two mutually orthogonal planes of symmetry, which are referred to as the first symmetry plane and the second symmetry plane, respectively. When a light sheet consisting of parallel light rays is directed along a symmetry plane, the astigmatic optical element causes the light sheet to focus into a tight light spot at a distance equal to a respective focal length of the astigmatic optical element. As indicated above, the focal length corresponding to the first symmetry plane is deliberately different from the focal length corresponding to the second symmetry plane. By definition, the symmetry plane that has the shorter of the two focal lengths is referred to as the "first" symmetry plane, and the symmetry plane that has the longer of the two focal lengths is referred to as the "second" symmetry plane. For example, for a conventional plano-cylindrical lens, the first symmetry plane contains the cylindrical axis of the lens (i.e., the axis that serves as an axis of symmetry for the cylindrical surface of the lens). In contrast, the second symmetry plane of a plano-cylindrical lens is orthogonal to the cylindrical axis of that lens. One skilled in the art will recognize that the focal length corresponding to the second symmetry plane of an ideal plano-cylindrical lens is infinity.

Two astigmatic optical elements are referred to as being in a "crossed" orientation or configuration with respect to one another when the first symmetry plane of one of the two astigmatic optical elements is approximately orthogonal to the first symmetry plane of the other of the two astigmatic optical elements.

Although various embodiments disclosed herein were described in reference to cylindrical lenses, other astigmatic optic elements, such as those listed above, can similarly be used in various alternative embodiments.

Various modifications of the described embodiments, as well as other embodiments of the invention, which are apparent to persons skilled in the art to which the invention pertains are deemed to lie within the principle and scope of the invention as expressed in the following claims.

For the purposes of this specification, a MEMS device is a device having two or more parts adapted to move relative to one another, where the motion is based on any suitable interaction or combination of interactions, such as mechanical, thermal, electrical, magnetic, optical, and/or chemical interactions. MEMS devices are fabricated using micro- or smaller fabrication techniques (including nano-fabrication techniques) that may include, but are not necessarily limited to: (1) self-assembly techniques employing, e.g., self-assembling monolayers, chemical coatings having high affinity to a desired chemical substance, and production and saturation of dangling chemical bonds and (2) wafer/material processing techniques employing, e.g., lithography, chemical vapor deposition, patterning and selective etching of materials, and treating, shaping, plating, and texturing of surfaces. The scale/size of certain elements in a MEMS device may be such as to permit manifestation of quantum effects. Examples of MEMS devices include, without limitation, NEMS (nano-electromechanical systems) devices, MOEMS (micro-opto-electromechanical systems) devices, micromachines, microsystems, and devices produced using microsystems technology or microsystems integration.

In some embodiments, beam steering may be implemented using a phased array element, such as liquid crystal on silicon micro displays or through an array of micromechanical phase shifters, or through arrays of electro-optic phase shifters using semiconductors, e.g., GaAs.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels (if any) in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those of ordinary skill in the art that any block diagrams herein represent conceptual views of illustrative circuitry and/or devices embodying the principles of the invention.

What is claimed is:

1. An apparatus, comprising:
   a first plurality of ports;
   a second plurality of ports;
   a first diffraction grating interposed between the first plurality of ports and the second plurality of ports;
   a first beam-steering device interposed between the first plurality of ports and the second plurality of ports and having a first beam-steering surface; and
   a first astigmatic optical element interposed between the first plurality of ports and the second plurality of ports, wherein:
      each port of the first plurality is configured to receive a respective input WDM signal having two or more respective WDM components;
      the apparatus is configured to variously route the WDM components from the first plurality of ports to the second plurality of ports such that each of the WDM components impinges on the first diffraction grating, the first beam-steering surface, and the first astigmatic optical element;
      the first diffraction grating is configured to spectrally disperse light received from the first plurality of ports and direct spectrally dispersed light to the first beam-steering surface;
      the first beam-steering surface is configurable to individually steer beams corresponding to different wavelength bands of the spectrally dispersed light received from the first diffraction grating to enable the apparatus to route any of the WDM components from the respective port of the first plurality to any port of the second plurality;
      the apparatus has a folded structure configured to cause a WDM component to traverse the first diffraction grating two times; and
      the apparatus further comprises a curved mirror configured to direct light between the first diffraction grating and the first beam-steering device such that the WDM component impinges on the curved mirror exactly four times.

2. The apparatus of claim 1, wherein the apparatus is configured to cause the first diffraction grating to receive the light from the first plurality of ports in a manner that causes light beams received from different ports of the first plurality of ports to be parallel to one another at the first diffraction grating.

3. The apparatus of claim 1, wherein the first astigmatic optical element is configured to image the first beam-steering surface onto a second beam-steering surface configurable to further individually steer the beams that have been steered by the first beam-steering surface to enable the apparatus to route any of the WDM components from the respective port of the first plurality to any port of the second plurality.

4. The apparatus of claim 3, wherein the apparatus further comprises an additional optical element configured to cause the apparatus to convert, for each WDM component, a change in the beam steering performed by the first beam-steering surface into a corresponding image-spot displacement at the second plurality of ports.

5. The apparatus of claim 4, wherein the additional optical element is a spherical lens.

6. The apparatus of claim 4, wherein:
   the additional optical element is a second astigmatic optical element; and
   the second astigmatic optical element is in a crossed orientation with respect to the first astigmatic optical element.

7. The apparatus of claim 3, wherein:
   the first beam-steering device comprises a two-dimensional array of beam-steering elements;
   a first portion of said two-dimensional array comprises the first beam-steering surface; and
   a second portion of said two-dimensional array comprises the second beam-steering surface, wherein the second portion is different from the first portion.

8. The apparatus of claim 3, further comprising a second astigmatic optical element interposed between the first plurality of ports and the second plurality of ports and configured to image the first diffraction grating onto the first beam-steering surface, wherein the apparatus is further configured to route the WDM components from the first plurality of ports to the second plurality of ports such that each of the WDM components also impinges on the second astigmatic optical element.

9. The apparatus of claim 1, wherein:
the first plurality of ports and the second plurality of ports have at least one port in common; and
the apparatus further comprises an optical circulator connected to a first of said at least one port in common and configured to separate an output WDM signal generated by the apparatus at said first port from the respective input WDM signal received by said first port.

10. The apparatus of claim 1, wherein:
the first beam-steering device comprises a two-dimensional pixelated MEMS mirror array; and
the first beam-steering surface comprises a plurality of mirror surfaces of said mirror array.

11. The apparatus of claim 1, wherein:
the first beam-steering device comprises a pixelated liquid-crystal-on-silicon micro-display; and
the first beam-steering surface comprises a plurality of pixels of said micro-display.

12. An apparatus, comprising:
a first plurality of ports;
a second plurality of ports;
a first diffraction grating interposed between the first plurality of ports and the second plurality of ports;
a first beam-steering device interposed between the first plurality of ports and the second plurality of ports and having a first beam-steering surface; and
a first astigmatic optical element interposed between the first plurality of ports and the second plurality of ports, wherein:
each port of the first plurality is configured to receive a respective input WDM signal having two or more respective WDM components;
the apparatus is configured to variously route the WDM components from the first plurality of ports to the second plurality of ports such that each of the WDM components impinges on the first diffraction grating, the first beam-steering surface, and the first astigmatic optical element;
the first diffraction grating is configured to spectrally disperse light received from the first plurality of ports and direct spectrally dispersed light to the first beam-steering surface;
the first beam-steering surface is configurable to individually steer beams corresponding to different wavelength bands of the spectrally dispersed light received from the first diffraction grating to enable the apparatus to route any of the WDM components from the respective port of the first plurality to any port of the second plurality;
the first plurality of ports and the second plurality of ports have at least one port in common; and
the apparatus further comprises an optical circulator connected to a first of said at least one port in common and configured to separate an output WDM signal generated by the apparatus at said first port from the respective input WDM signal received by said first port.

13. An apparatus, comprising:
a first plurality of ports;
a second plurality of ports;
a first diffraction grating interposed between the first plurality of ports and the second plurality of ports;
a first beam-steering device interposed between the first plurality of ports and the second plurality of ports and having a first beam-steering surface; and
a first astigmatic optical element interposed between the first plurality of ports and the second plurality of ports, wherein:
each port of the first plurality is configured to receive a respective input WDM signal having two or more respective WDM components;
the apparatus is configured to variously route the WDM components from the first plurality of ports to the second plurality of ports such that each of the WDM components impinges on the first diffraction grating, the first beam-steering surface, and the first astigmatic optical element;
the first diffraction grating is configured to spectrally disperse light received from the first plurality of ports and direct spectrally dispersed light to the first beam-steering surface;
the first beam-steering surface is configurable to individually steer beams corresponding to different wavelength bands of the spectrally dispersed light received from the first diffraction grating to enable the apparatus to route any of the WDM components from the respective port of the first plurality to any port of the second plurality; and
the apparatus further comprises a first curved mirror configured to direct light between the first plurality of ports and the second plurality of ports such that the WDM component impinges on the first curved mirror exactly three times.

14. The apparatus of claim 13, wherein the first astigmatic optical element is configured to image the first beam-steering surface onto a second beam-steering surface configurable to further individually steer the beams that have been steered by the first beam-steering surface to enable the apparatus to route any of the WDM components from the respective port of the first plurality to any port of the second plurality.

15. The apparatus of claim 14, further comprising a second beam-steering device interposed between the first plurality of ports and the second plurality of ports, wherein the second beam-steering device comprises the second beam-steering surface.

16. The apparatus of claim 15, further comprising a second diffraction grating interposed between the first plurality of ports and the second plurality of ports, wherein the apparatus is further configured to route the WDM components from the first plurality of ports to the second plurality of ports such that each of the WDM components also impinges on the second diffraction grating.

17. The apparatus of claim 16, further comprising:
a second astigmatic optical element interposed between the first plurality of ports and the second plurality of ports and configured to image the first diffraction grating onto the first beam-steering surface; and
a third astigmatic optical element interposed between the first plurality of ports and the second plurality of ports and configured to image the second beam-steering surface onto the second diffraction grating, wherein:
the apparatus is further configured to route the WDM components from the first plurality of ports to the second plurality of ports such that each of the WDM components also impinges on the second astigmatic optical element and the third astigmatic optical element;

the second astigmatic optical element is in a crossed orientation with respect to the first astigmatic optical element; and the third astigmatic optical element is in a crossed orientation with respect to the first astigmatic optical element.

18. The apparatus of claim 16, further comprising a second curved mirror configured to direct light between the first plurality of ports and the second plurality of ports such that the WDM component impinges on the second curved mirror exactly three times.

* * * * *